US006250646B1

(12) United States Patent
Chang

(10) Patent No.: US 6,250,646 B1
(45) Date of Patent: Jun. 26, 2001

(54) HIGH PRESSURE-HIGH TEMPERATURE PIPE GASKET

(76) Inventor: Chye-Tao Chang, No. 43, Lane 151, Fu-Jen Rd., Ling-Ya Dist., Kaohsiung (TW)

( * ) Notice: Subject to any disclaimer, the term of this patent is extended or adjusted under 35 U.S.C. 154(b) by 0 days.

(21) Appl. No.: 09/414,561

(22) Filed: Oct. 8, 1999

(51) Int. Cl.$^7$ ....................................................... F16J 15/12
(52) U.S. Cl. .......................... 277/603; 277/605; 277/610
(58) Field of Search ................................... 277/603, 605, 277/610, 633

(56) References Cited

U.S. PATENT DOCUMENTS

| | | |
|---|---|---|
| 1,636,363 * | 7/1927 | Hettinger . |
| 1,856,580 * | 5/1932 | Mitchell . |
| 2,027,299 * | 1/1936 | Bohmer, Jr. et al. . |
| 2,384,672 * | 9/1945 | Gleeson . |
| 3,360,273 * | 12/1967 | Hundt et al. . |
| 4,993,722 * | 2/1991 | Gundy . |
| 5,275,423 * | 1/1994 | Allen et al. . |
| 5,308,090 * | 5/1994 | Hamada et al. . |
| 5,913,522 * | 6/1999 | Koch . |

* cited by examiner

Primary Examiner—James R. Brittain
Assistant Examiner—John L. Beres
(74) Attorney, Agent, or Firm—Bacon & Thomas, PLLC

(57) ABSTRACT

A high pressure-high temperature gasket for high pressure-high temperature pipe is disclosed. The high pressure-high temperature gasket comprises a hollow annular member defining an interior tunnel. The interior tunnel is filled with a stuffing to enhance the axial resilience of the annular member such that the high pressure-high temperature gasket can seal the joint between two high pressure-high temperature pipes, and be reused so as to decrease the coat of using the gasket.

9 Claims, 7 Drawing Sheets

HIGH PRESSURE-HIGH TEMPERATURE PIPE GASKET

BACKGROUND OF THE INVENTION

1. Field of the Invention

The present invention relates to a gasket structure, and more particularly to a gasket for a high pressure-high temperature pipe.

2. Description of Related Art

Referring to FIG. 8, a conventional gasket assembly squeezed between two pipe flanges to seal the pipe joint and stop leaks at the joint includes a spiral washer (50) with a stuffing therein and at least one collar (52) securely mounted on the outer or inner periphery of the washer (50). However, because the conventional gasket assembly lacks of axial resilience, the bond between two pipes will deform the washer (50) when the conventional gasket assembly is used in a high pressure-high temperature pipe system, such that the gasket assembly will easily be destroyed by the pressure of the two pipe flanges. Furthermore, when a pipe joint is disassembled, the used gasket assembly must be replaced with a new one before the pipe joint is reassembled. This will increase the cost of the gasket assembly for the pipe system.

Another conventional gasket assembly, as shown in FIG. 9, includes a spiral washer (50) with a stuffing therein and at least one spiral seal (54) securely mounted on the outer or inner periphery of the washer (50). However, the disadvantage of this conventional gasket assembly is the same as that of the conventional gasket assembly as shown in FIG. 8.

To overcome the shortcomings, the present invention tends to provide an improved extension cord housing to mitigate or obviate the aforementioned problems.

SUMMARY OF THE INVENTION

In accordance with one aspect of this present invention, the high pressure-high temperature gasket comprises a hollow annular member, so that the gasket has an axial resilience and can resist the pressure of the combination of two pipe flanges such that the gasket can be reused.

In accordance with another aspect of this present invention, the high pressure-high temperature gasket further comprises a multi-layer washer securely mounted on the outer or inner periphery of the annular member, so that the washer enhances the resilience of the gasket.

In accordance with further aspect of this present invention, the high pressure-high temperature gasket comprises a stuffing member stuffed into the annular member to improve the resilience thereof.

Other objects, advantages and novel features of the invention will become more apparent from the following detailed description when taken in joint with the accompanying drawings.

DETAILED DESCRIPTION OF PREFERRED EMBODIMENT

Figure 1:
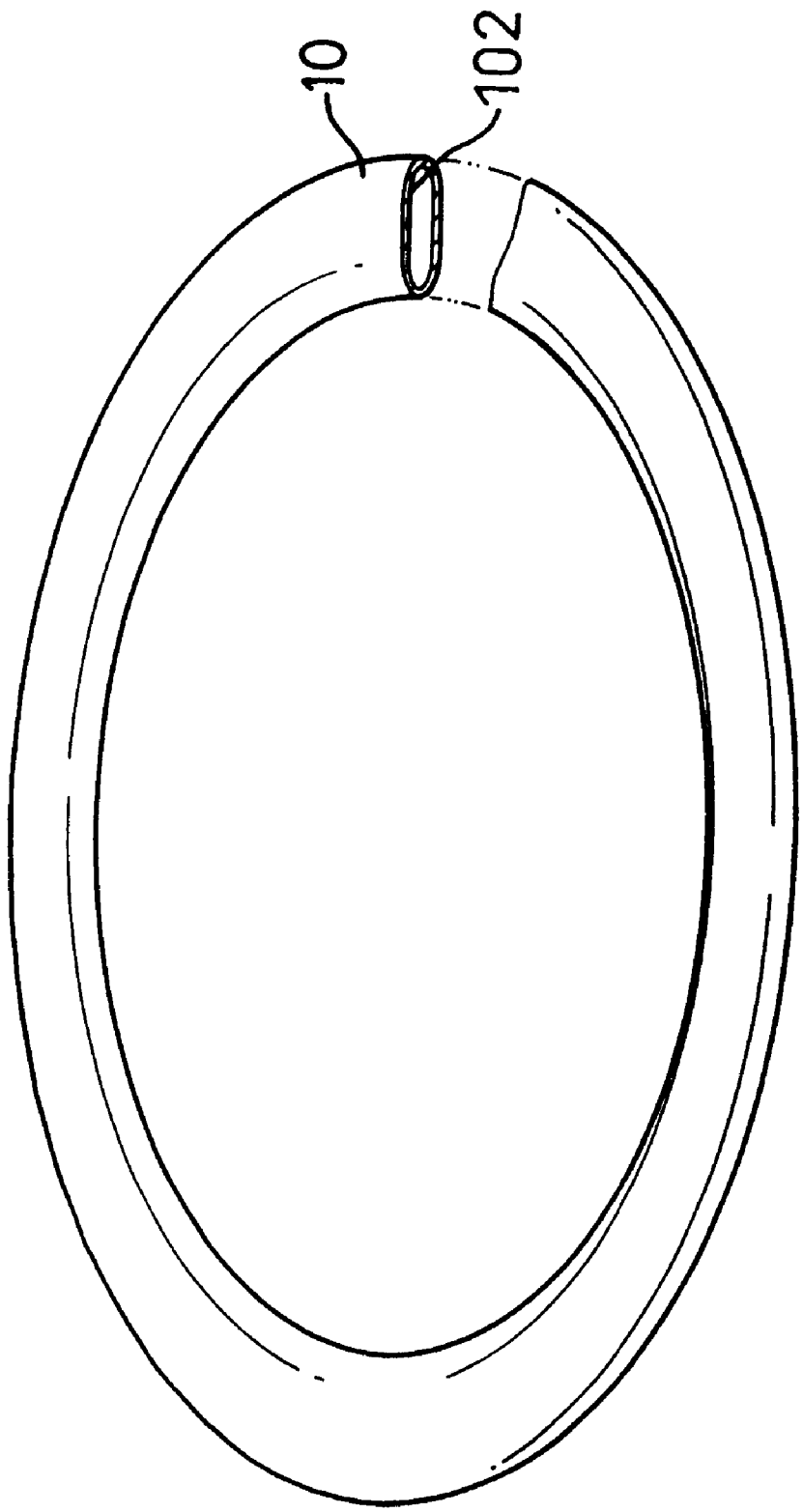
FIG. 1 is a perspective view of a high pressure-high temperature gasket in accordance with the present invention.
Figure 2:
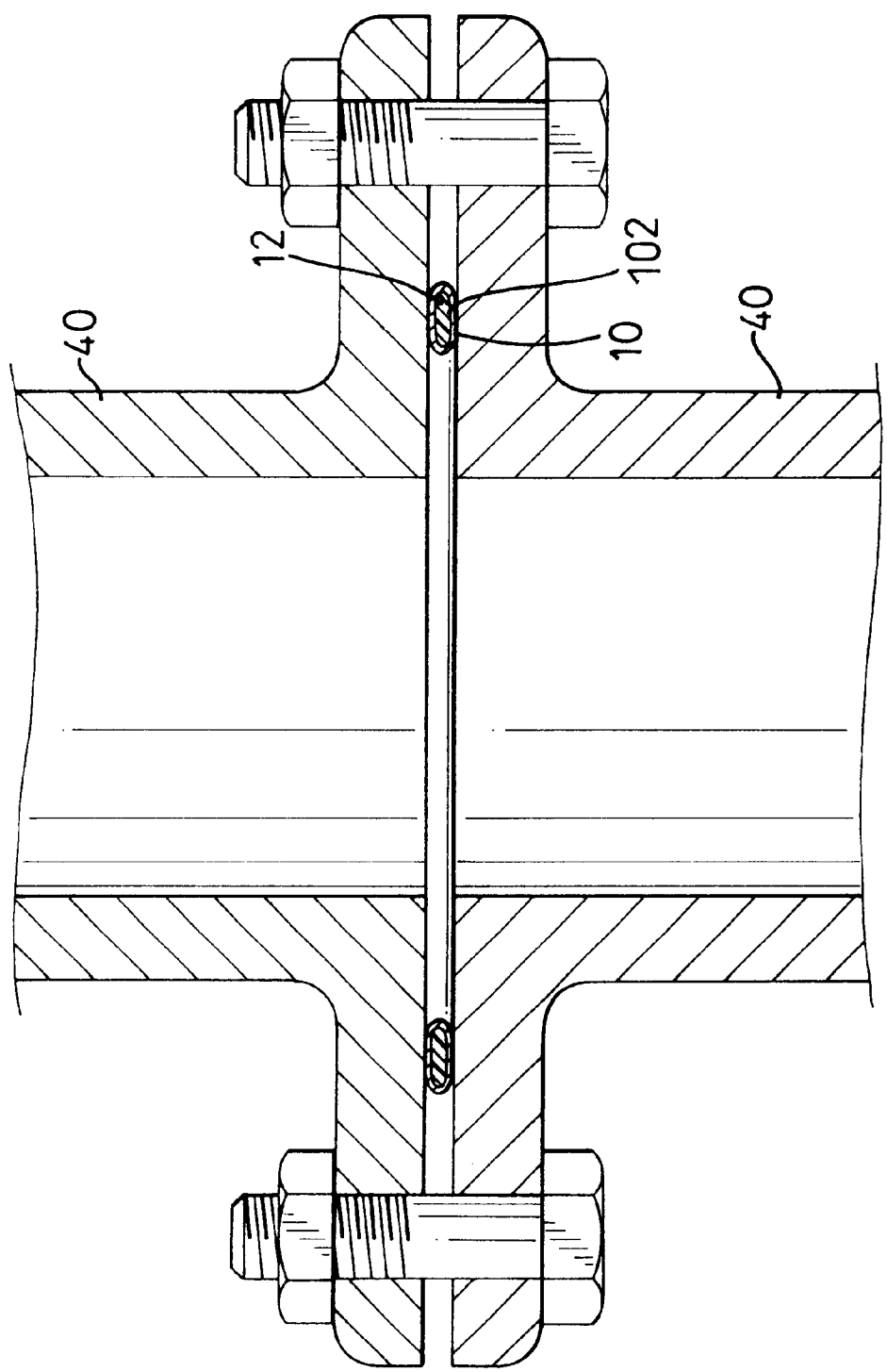
FIG. 2 is a side plan view in partial section of the high pressure-high temperature gasket in FIG. 1 in a pipe joint.

Referring to FIG. 1, a high pressure-high temperature gasket in accordance with the present invention comprises a first hollow annular member (10) defining an interior tunnel (102) therein, so that the annular member (10) has an axial resilience. A stuffing (12) such as Teflon, graphite, etc. is stuffed into the interior tunnel (102) of the first annular member (10) so as to improve the axial resilience thereof. In operation, referring to FIG. 2, the annular member (10) is positioned and squeezed between two flanges formed on the corresponding end of two pipes (40), and the annular member (10) will seal the joint between the two pipe (40) flanges when the two flanges are securely connected with bolts and nuts. In such a manner, because the hollow annular member (10) has an axial flexibility, the annular member (10) will not be destroyed by the bond of the combination of the two flanges, and the two flanges can be tightened when a leak occurs. Therefore, the gasket can be reused when the two pipes (40) are reassembled.

Figure 3:
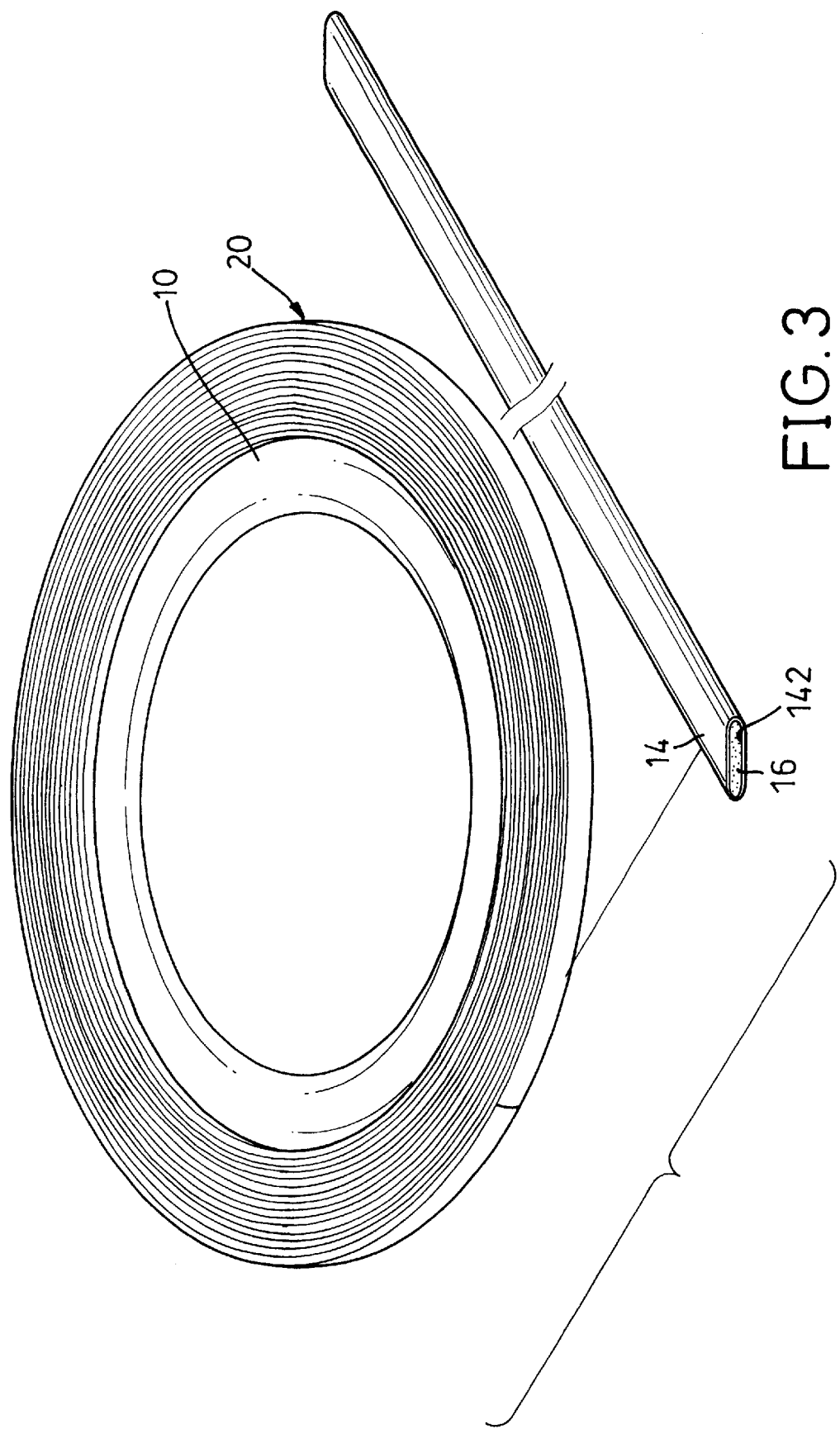
FIG. 3 is a perspective view of another embodiment of a high pressure-high temperature gasket in accordance with the present invention.
Figure 4:
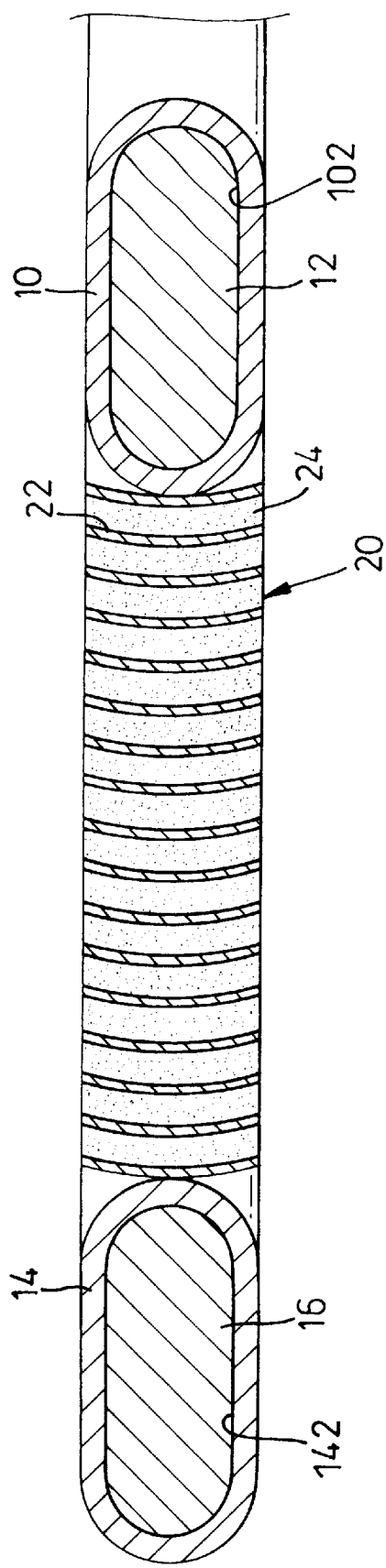
FIG. 4 is a side plan view in partial section of the high pressure-high temperature gasket in FIG. 3.
Figure 5:
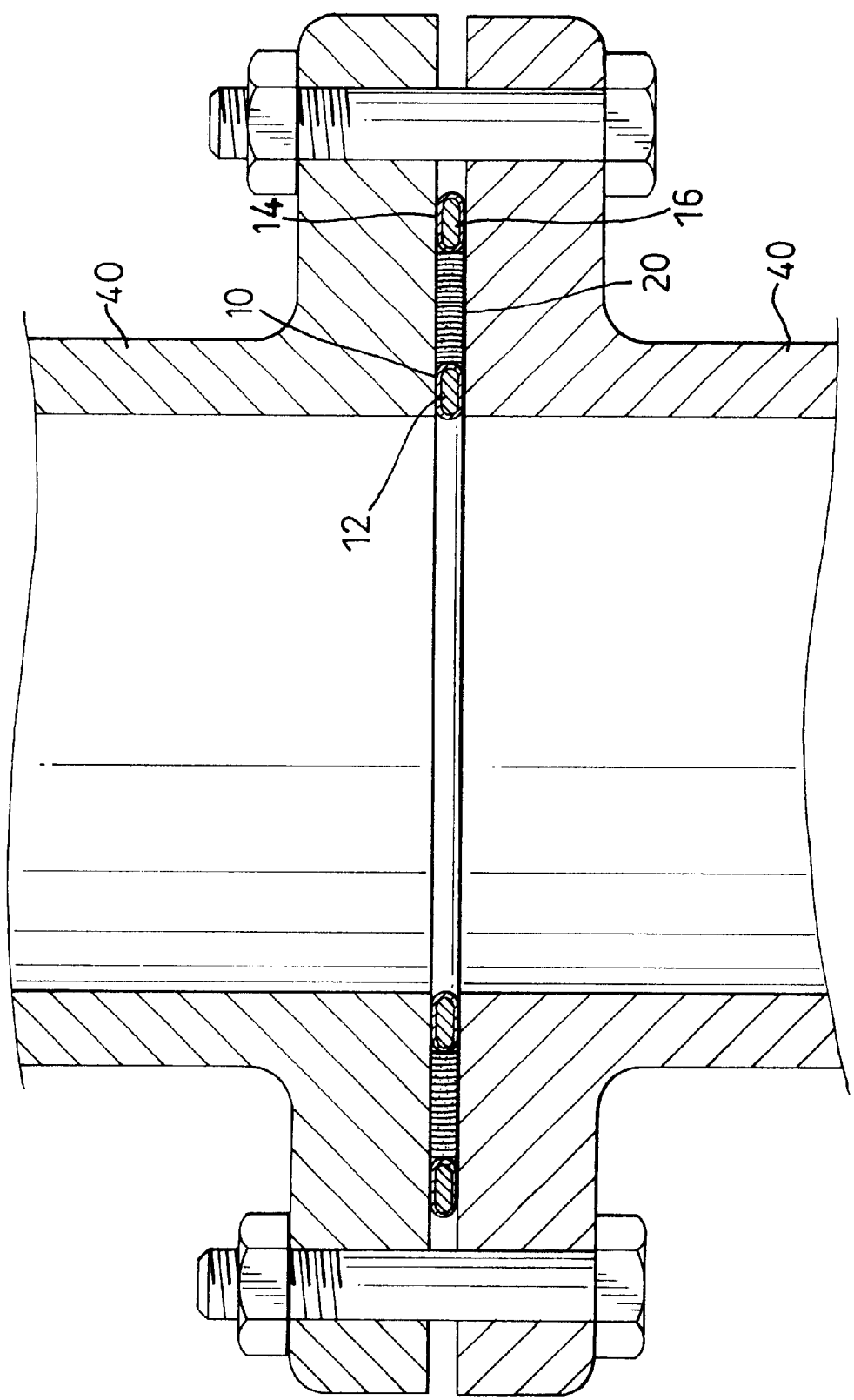
FIG. 5 is a side plan view in partial section of the high pressure-high temperature gasket in FIG. 3 in a pipe joint.

Referring to FIGS. 3 and 4, an another embodiment of a high pressure-high temperature gasket in accordance with the present invention comprises a first annular member (10), a second annular member (14) concentrically disposed on the first annular member (10) defining an interior tunnel (142), and a spiral washer (20) securely and intermediately mounted between the first and second annular members (10,14). The washer (20) is formed by coiling a metal band and spirally forming a plurality of multi-layer washers (22), so that the washer (20) has an axial resilience to resist an axial force. At least one of the first and second annular member (10,14) is filled with a stuffing (12,16) in the interior tunnel (102,142). In operation, referring now to FIGS. 4 and 5, the high pressure-high temperature gasket is positioned and squeezed between two flanges formed on the corresponding end of two pipes (40). The first annular member (10), the second annular member (14), and the washer (20) will seal the joint between the two flanges when the two flanges are securely connected. By such a manner, because the elements of the high pressure-high temperature gasket all have an axial flexibility, the high pressure-high temperature gasket will not be destroyed by the crushing bond of the two flanges, and can be reused when the two pipes (40) are reassembled.

Figure 6:
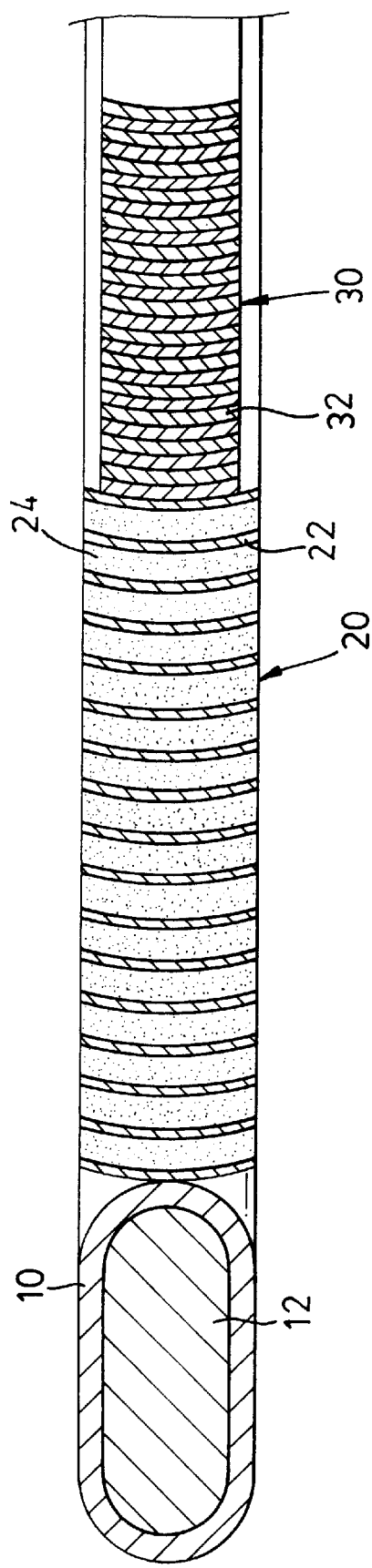
FIG. 6 is a side plan view in partial section of another embodiment of a high pressure-high temperature structure in accordance with the present invention.

Another embodiment of a high pressure-high temperature gasket shown in FIG. 6 comprises a hollow annular member (10), a spiral washer (20) securely mounted on the inner periphery of the annular member (10), and a spiral seal (30) securely mounted on the inner periphery of the washer (20). The seal (30) is formed by coiling a metal band and integrally forming a plurality of multi-layers seals (32)

abutting each other, so that the seal (30) has an axial resilience to resist an axial force. Therefore, the high pressure-high temperature gasket shown in FIG. 6 can be used to seal the joint between two pipes and reused.

Figure 7:
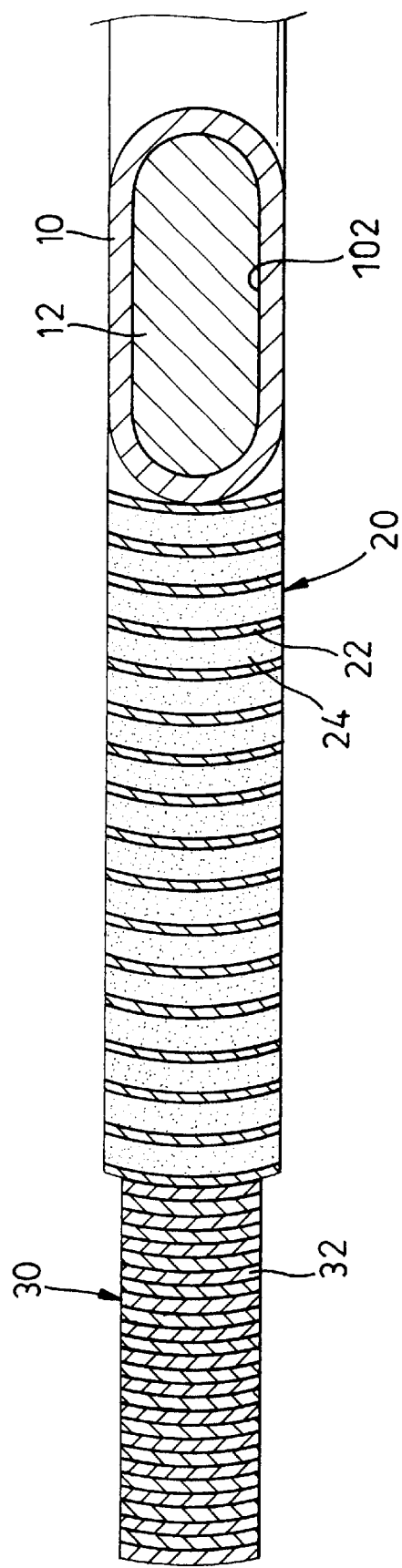
FIG. 7 is a side plan view in partial section of another embodiment of a high pressure-high temperature gasket in accordance with the present invention.
Figure 8:
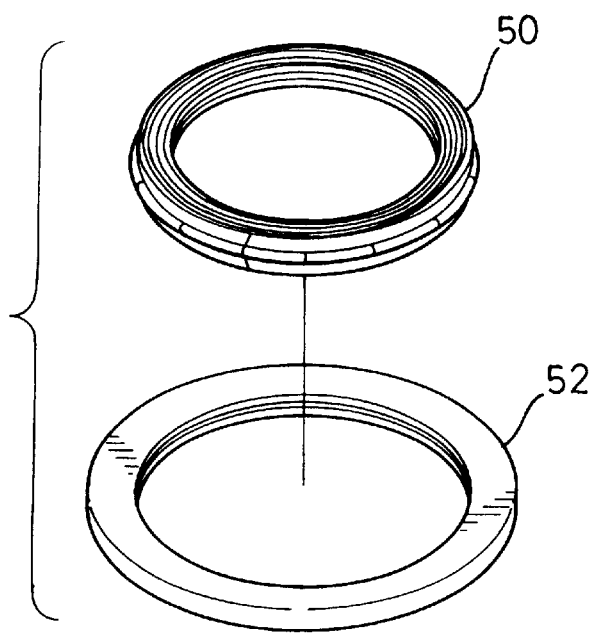
FIG. 8 is a exploded perspective view of a conventional high pressure-high temperature gasket assembly in accordance with the prior art.
Figure 9:
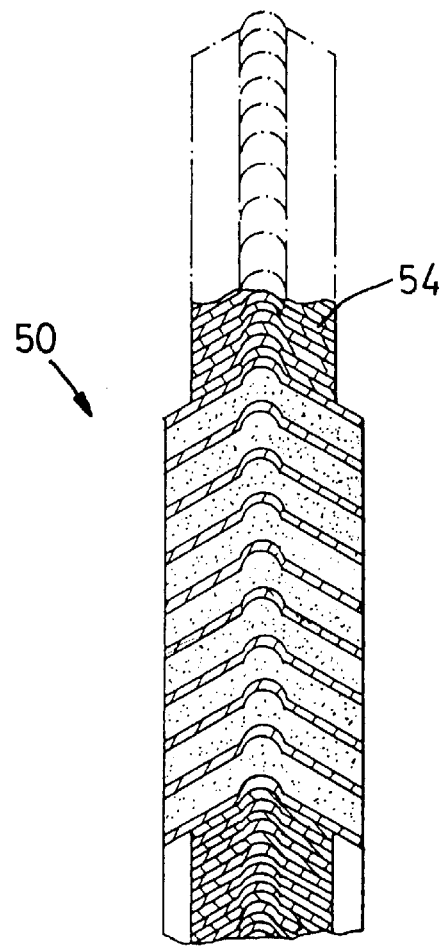
FIG. 9 is a plane view in partial section of a conventional high pressure-high temperature gasket assembly in accordance with the prior art.

In another embodiment, the high pressure-high temperature gasket in accordance with the present invention, shown in FIG. 7, comprises a hollow annular member (10), a spiral washer (20) securely mounted on the outer periphery of the annular member (10), and a spiral seal (30) securely mounted on the outer periphery of the washer (20). The high pressure-high temperature gasket shown in FIG. 7 can be used in sealing the joint of two pipes and reused.

Furthermore, the washer (20) as shown in FIGS. 4, 6, and 7 is stuffed with a stuffing (24) between each two adjacent washers (22), which is formed by abutting a stuffing band and a metal band on and coiling the stuffing and metal bands simultaneously. This will enhance the axial flexibility of the washer (20) and improve the sealing effect of the gasket.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A high pressure-high temperature gasket comprising: a first hollow annular member (10) defining an interior tunnel (102) therein, interior tunnel (102) being filled with a stuffing (12), a multi-layer washer (20) having a plurality of washers (22) spirally formed therefrom, said multi-layer washer (20) being concentrically mounted on said first annular member (10) and filled with a stuffing (24) between the washers (22).

2. The gasket of claim 1, wherein said multi-layer washer (20) is mounted on the inner periphery of said first annular member (10).

3. The gasket of claim 2, further comprising a multi-layer seal (30) spirally defining a plurality of seals (32) abutting each other, said multi-layer seal (30) being concentrically mounted on the inner periphery of said multi-layer washer (20).

4. The gasket of claim 2, further comprising a multi-layer seal (30) spirally defining a plurality of seals (32) abutting each other, said multi-layer seal (30) being concentrically mounted on the outer periphery of said first annular member (10).

5. The gasket of claim 2, further comprising a second hollow annular member (14) defining an interior tunnel (142) therein, said second hollow annular member (14) being concentrically mounted on the inner periphery of said multi-layer washer (20) and filled with a stuffing (16) in said interior tunnel (142).

6. The gasket of claim 1, wherein said multi-layer washer (20) is mounted on the outer periphery of said first annular member (10).

7. The gasket of claim 6, further comprising a multi-layer seal (30) spirally defining a plurality of seals (32) abutting each other, said multi-layer seal (30) being concentrically mounted on the outer periphery of said multi-layer washer (20).

8. The gasket of claim 6, further comprising a multi-layer seal (30) spirally defining a plurality of seals (32) abutting each other, said multi-layer seal (30) being concentrically mounted on the inner periphery of said first annular member (10).

9. The gasket of claim 6, further comprising a second hollow annular member (14) defining an interior tunnel (142) therein, said second hollow annular member (14) being concentrically mounted on the outer periphery of said multi-layer washer (20) and filled with a stuffing (16) in said interior tunnel (142).

* * * * *